(12) United States Patent
Hashii et al.

(10) Patent No.: US 9,489,534 B2
(45) Date of Patent: Nov. 8, 2016

(54) MULTI-LEVEL SECURITY SYSTEM FOR ENABLING SECURE FILE SHARING ACROSS MULTIPLE SECURITY LEVELS AND METHOD THEREOF

(71) Applicant: Northrop Grumman Systems Corporation, Falls Church, VA (US)

(72) Inventors: Brant D. Hashii, Long Beach, CA (US); Mark O. Scott, Escondido, CA (US); Daniel R. Silverman, Hermosa Beach, CA (US); Lee Wixtrom, La Palma, CA (US); Jonathan Tester, Encinitas, CA (US); Steve A. Brown, Los Angeles, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 5 days.

(21) Appl. No.: 14/522,447

(22) Filed: Oct. 23, 2014

(65) Prior Publication Data
US 2016/0117519 A1    Apr. 28, 2016

(51) Int. Cl.
*G06F 21/62*    (2013.01)
*G06F 17/30*    (2006.01)

(52) U.S. Cl.
CPC ..... *G06F 21/6218* (2013.01); *G06F 17/30203* (2013.01); *G06F 21/62* (2013.01); *G06F 17/30* (2013.01)

(58) Field of Classification Search
USPC .......................................................... 713/166
See application file for complete search history.

(56) References Cited

U.S. PATENT DOCUMENTS

| 6,351,817 B1 | 2/2002 | Flyntz |
| 7,266,658 B2 | 9/2007 | Harrington et al. |

(Continued)

*Primary Examiner* — Jeffrey Pwu
*Assistant Examiner* — Samuel Ambaye
(74) *Attorney, Agent, or Firm* — Stetina Brunda Garred & Brucker

(57) ABSTRACT

A multi-level security system includes a storage medium partitionable into a plurality of partitions, a file system coupleable to the plurality of partitions, and a plurality of enclaves. Each enclave is assigned a security classification level. Each enclave resides in a different storage partition of the storage medium. Data stored on the storage medium is cryptographically separated at rest on a per-enclave basis. Cryptographic separation occurs at the disk block level, allowing individual blocks to be read and decrypted. The system also includes a reference monitor that enforces a system security policy that governs access to information between the enclaves. The reference monitor allows an enclave having a first classification level to securely read-down to an enclave having a second classification level lower than the first classification level and to write to another enclave having the first classification level.

6 Claims, 4 Drawing Sheets

```
Applications

Operating System Services
(Device Drivers, File Systems,
Network Communications)

Memory Management

Hardware
(MMU, Interrupts)
```

(56) References Cited

U.S. PATENT DOCUMENTS

| | | |
|---|---|---|
| 7,546,334 B2 | 6/2009 | Redlich et al. |
| 8,041,947 B2 | 10/2011 | O'Brien et al. |
| 8,060,744 B2 | 11/2011 | O'Brien et al. |
| 8,127,145 B2 | 2/2012 | O'Brien et al. |
| 8,130,960 B2 | 3/2012 | Zimmer et al. |
| 8,132,004 B2 | 3/2012 | Price |
| 8,327,419 B1 | 12/2012 | Korablev et al. |
| 8,359,641 B2 | 1/2013 | DelRocco et al. |
| 8,397,026 B2 | 3/2013 | Wynne et al. |
| 8,477,946 B2 | 7/2013 | Funk et al. |
| 9,027,078 B1* | 5/2015 | Manmohan ............ G06F 21/53 726/1 |
| 2005/0154910 A1 | 7/2005 | Shaw et al. |
| 2006/0248599 A1* | 11/2006 | Sack .................. G06F 21/6227 726/27 |
| 2007/0056042 A1 | 3/2007 | Qawami et al. |
| 2010/0058486 A1 | 3/2010 | Wilson et al. |
| 2011/0302413 A1 | 12/2011 | Arroyo et al. |
| 2012/0185911 A1 | 7/2012 | Polite et al. |
| 2012/0198538 A1* | 8/2012 | Spring .................. G06F 21/78 726/9 |

\* cited by examiner

MULTI-LEVEL SECURITY SYSTEM FOR ENABLING SECURE FILE SHARING ACROSS MULTIPLE SECURITY LEVELS AND METHOD THEREOF

STATEMENT RE: FEDERALLY SPONSORED RESEARCH/DEVELOPMENT

This invention was made under government support under a restrictive contract; as such the government has certain rights in the invention.

CROSS-REFERENCE TO RELATED APPLICATIONS

Not Applicable

BACKGROUND

1. Technical Field

The present disclosure relates to multi-level secure information retrieval systems. More particularly, the present disclosure relates to a multi-level security system for enabling secure file sharing across multiple security levels and a method thereof.

2. Discussion of Related Art

Businesses and government need verifiably secure platforms to field high-assurance Multiple Levels of Security (MLS) systems for the management of classified and other high-valued information, whose confidentiality, integrity and/or releasability must be protected.

The United States Department of Defense (DoD) has mandated that the Global Information Grid (GIG) will be the primary technical framework to support U.S. network-centric warfare and network-centric operations. Under this directive, all advanced weapons platforms, sensor systems, and command and control centers are eventually to be linked via the GIG. Network-Centric Operations (NCO) is characterized by the sharing of information at all security levels between new and legacy systems within the GIG. Information that is passed between and within these systems must be shared securely to protect military personnel and not compromise the mission. In the commercial sector, dominant competitors have developed information superiority and translated it into a competitive advantage by making the shift to network-centric operations.

Based on current and emerging doctrine for DoD, Network-Centric Warfare (NCW) capabilities seek to translate an information advantage, enabled in part by information technology, into an increased combat power through the robust networking of well-informed geographically dispersed forces. NCW is more about networking than networks. It is about the increased combat power that can be generated by a network-centric force. A robustly networked force improves information sharing, which, in turn, enhances the quality of information and shared situational awareness. Shared situational awareness enables collaboration and self-synchronization, and enhances sustainability and speed of command, and these, in turn, have the potential to dramatically increase mission effectiveness. These capabilities will assist in increasing the common operational picture, or more correctly, the common operational understanding, of all players within the networked battlespace. In essence, NCW translates information superiority into combat power by effectively linking knowledgeable entities in the battlespace.

The United States Air Force (USAF) and other DoD services and agencies have a need for MLS solutions to ensure the protection of classified data and sensitive information related to national security. For example, MLS operation is a prerequisite to providing embedded airborne platform network connectivity. Types of government security levels include: Top Secret (TS); Secret (S); Confidential (C); and Unclassified (U). These MLS security levels may be supplemented with "need to know" classification labels (e.g., Special Access Required (SAR)), organizational limits (e.g., Army, Navy, DoD) and/or time limits. Categories that are not classifications include: Sensitive Compartmented Information (SCI); and Special Access Programs (SAP).

Providing efficient transfer of information between networks having different levels of security classification in network-centric warfare and network-centric operations is difficult. An example of a computer security policy is the Bell-LaPadula (BPL) security model. The BPL model uses concepts such as domination of the MLS security level over both a process and the subject (a data object). Some examples of process rules under the BPL model are: NRU—No Read Up (a lower security level cannot read a document at a higher security level); and NWD—No Write Down (a higher level cannot write down to a lower MLS level). The strategy is based on a coupling of special microprocessor hardware features, often involving the memory management unit, to a special correctly implemented operating system kernel. This forms the foundation for a secure operating system which, if certain critical parts are designed and implemented correctly, can ensure the absolute impossibility of penetration by hostile elements. This capability is enabled because the configuration not only imposes a security policy, but in theory completely protects itself from corruption. Ordinary operating systems, on the other hand, lack the features that assure this maximal level of security. An example of a system architecture including an ordinary operating system is shown in FIG. 1.

The Common Criteria for Information Technology Security Evaluation (abbreviated as Common Criteria or CC) is an international standard (ISO/IEC 15408) for computer security certification. Common Criteria is a framework in which computer system users can specify their security functional and assurance requirements. The Evaluation Assurance Level (EAL 1 through EAL 7) of an information technology (IT) product or system is a numerical grade assigned following the completion of a Common Criteria security evaluation. Higher EALs reflect added assurance requirements that must be met to achieve a particular certification. The EAL level does not measure the security of the system itself; it simply states at what level the system was tested.

To achieve a particular EAL, the computer system must generally meet specific assurance requirements. Most of these requirements involve design documentation, design analysis, functional testing, and/or penetration testing. The EAL number assigned to a certified system indicates that the system completed all requirements for that level. In some cases, the evaluation may be augmented to include assurance requirements beyond the minimum required for a particular EAL. Officially this is indicated by following the EAL number with the word augmented and usually with a list of codes to indicate the additional requirements. As shorthand, vendors will often simply add a "plus" sign (as in EAL4+) to indicate the augmented requirements.

The higher EALs involve more detailed documentation, analysis, and testing than the lower ones. Achieving a higher EAL certification therefore generally costs more money and takes more time than achieving a lower one. Some embedded avionics systems operate at a "system high" classification protocol, meaning that all data residing on the system must be treated as if classified at the aggregate classification level of all system resident data. Operating at system high has the drawback that it is difficult to generate outputs that are at a lower level than system high, and this prevents the system from operating collaboratively with other systems not at the same level. This negatively impacts system performance by restricting and/or delaying data sharing with other networked systems, a constraint that directly conflicts with the goal of improved information sharing. Operating at system high also increases total system cost of ownership by requiring system operators to clear all personnel that touch the system to the aggregate classification of all hosted data. Another approach to enable secure file sharing across multiple security levels is to maintain separate file stores for each security enclave with a complete copy of each lower enclave in addition to its own data (e.g., the secret file store keeps a complete copy of the unclassified file store). This has drawbacks in weight and power requirements and the wasted disk space for redundant copies of data at each enclave. In an alternative approach, the file system is configured to encrypt whole files instead of individual disk blocks. The drawbacks to this approach are that an entire file must be read from the disk and decrypted before any part of it can be read. Running the security software at a higher level of logical abstraction also makes eliminating leaks and covert channels more difficult.

Multiple independent levels of security (MILS) operating systems known as separation kernels have been developed to provide full data separation and hence MLS operation. MILS is a component-based high-assurance security computer architecture based on the concepts of separation and controlled information flow. An example of a system architecture including an operating system employing a separation kernel is shown in FIG. 2. MILS is implemented through the utilization of separation mechanisms that support both untrusted and trustworthy components, thus ensuring that the total security solution is nonbypassable, evaluatable, always invoked, and tamperproof. A MILS solution allows for independent evaluation of security components and trusted composition. A system incorporating a MILS solution, sometimes referred to as a MILS system, employs one or more separation mechanisms (e.g., separation kernel, separation communication system, physical separation) to maintain assured data and process separation. A MILS system supports enforcement of one or more application/system specific security policies by authorizing information flow only between components in the same security domain or through trustworthy security monitors (e.g., access control guards, downgraders, crypto devices, etc.). In some systems of this type, data separation is achieved between different virtual address spaces on a single processor, as opposed to across multiple processors typically found in an embedded avionics system or multiple networked systems.

The Galois Trusted Services Engine (TSE) provides read-down MLS access control in a MILS separation kernel. The TSE uses physically separate disks wherein the content of each disk is stored in plaintext and the mechanism of separation is their block access controller. There are a number of MLS file systems included in MLS operating systems, including low-robustness to medium-robustness systems like Trusted Solaris and Security-Enhanced Linux (SELinux) where the amount of software that needs to be trusted is quite large. There are a few high-robustness operating systems, like the Gemini Secure Operating System (GEMSOS), developed to run on desktop-type systems.

FIG. 3 shows an abstract view of a separation kernel that is known in the prior art for the separation of information within a single processor. As illustrated in FIG. 3, the separation kernel may be configured to ensure that only the information flows depicted by the arrows actually occur. Furthermore, the separation kernel may be configured to ensure that no critical task is bypassed. Another purpose of the separation kernel is to ensure that each task's private data remains private, i.e., to ensure that other partitions cannot detect, even by deduction, that another partition is receiving or processing data. One partition should be configured such that it is not aware of the other partitions and it is itself transparent to the other partitions.

As illustrated in FIG. 3, the separation kernel (shown generally as 300) may include a red protocol machine ("RPM") 310, which may be configured to receive unencrypted data (i.e., red data) from, for example, a partition within a processor or computer. The red protocol machine 310 may also receive information from the red verifier ("RV") 321, which is being sent into the processor or computer. When red data is received by the red protocol machine 310, it is transferred to a trusted red switch ("TRS") 320, which is trusted to receive red information and route that information to the proper encryption algorithm E1, E2, or E3 330, 331, 332, respectively. In one configuration, the separation kernel 300 may include an encryption algorithm that is uniquely associated with the particular sensitivity of information. Furthermore, the trusted red switch 320 may be configured to route data of a particular sensitivity to the correct associated encryption algorithm. Once the appropriate encryption algorithm 330, 331, 332 has been applied to the data, the data may be output to the black verifier ("BV") 340, which may be configured to ensure that the data output from the encryption algorithms is properly encrypted. The black verifier 340 may then pass the data on to the black protocol machine ("BPM") 350. The black protocol machine 350 may be configured to receive encrypted data (i.e., black data) from both the black verifier 340 and from other locations within a processor or computer, such as, for example, a storage device. The black protocol machine 350 may receive this data and send it to a black switch ("BS") 340. The black switch 340 may be configured to receive encrypted data from the black protocol machine 350 and route that data to the appropriate decryption algorithm for further processing. The decryption algorithms (D1, D2, D3) 333, 334, 335 may be associated with particular types of classified data that may be utilized in the system. Furthermore, decryption algorithms 333, 334, and 335 may be configured to decrypt data that was encrypted with an associated encryption algorithm 330, 331, or 332. After the data has been decrypted by the decryption algorithms 333, 334, 335 it may be passed to the red verifier ("RV") 321, which may be configured to ensure that the data has been appropriately decrypted and to send the data into the red protocol machine 310 to be input into a proper partition within, for example, the processor, for further processing.

The separation kernel is one example of how information of different sensitivities may be permitted to flow within a given processor. Using a separation kernel, an operating system may be configured to be trusted to ensure that the information flow within the processor can be trusted not to improperly allow access to classified information. The separation kernel, however, has been traditionally limited to single-processor systems. The prior art has failed to prove that the same level of trust may be maintained when the information is flowing on a common network between computers having different permissions and which may be configured to have access to predetermined sensitivities or classifications of information.

Thus, there is a need for a multi-level security system for enabling secure file sharing across multiple security levels.

BRIEF SUMMARY

According to an aspect of the present disclosure, a multi-level security system enabling secure file sharing across multiple security levels is provided. The system includes a storage medium that is partitionable into a plurality of partitions, a file system coupleable to the plurality of partitions, and a plurality of enclaves each assigned a security classification level. Each one of the plurality of enclaves resides in a different storage partition of the storage medium. Data stored on the storage medium is cryptographically separated at rest on a per-enclave basis. Cryptographic separation occurs at the disk block level, thereby allowing individual blocks to be read and decrypted. The system also includes a reference monitor that enforces a system security policy that governs access to information between the plurality of enclaves. The reference monitor allows an enclave of the plurality of enclaves having a first classification level to securely read-down to another enclave of the plurality of enclaves having a second classification level lower than the first classification level and to write to another enclave of the plurality of enclaves having the first classification level.

According to another aspect of the present disclosure, a non-transitory computer-readable medium embodying program instructions for execution by a data processing apparatus is provided. The program instructions adapt the data processing apparatus for transmitting information classified at different security classification levels while maintaining data separation of the information. The program instructions include: forming a plurality of enclaves defining disparate security domains by dividing information stored on a storage medium into a plurality of non-overlapping partitions; assigning a security classification level to each one of the plurality of enclaves; and enforcing a system security policy that governs the flow of information between the plurality of enclaves. The security policy allows a first enclave having a first classification level to securely read-down to a second enclave having a second classification level lower than the first classification level and to write to a third enclave having the first classification level.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
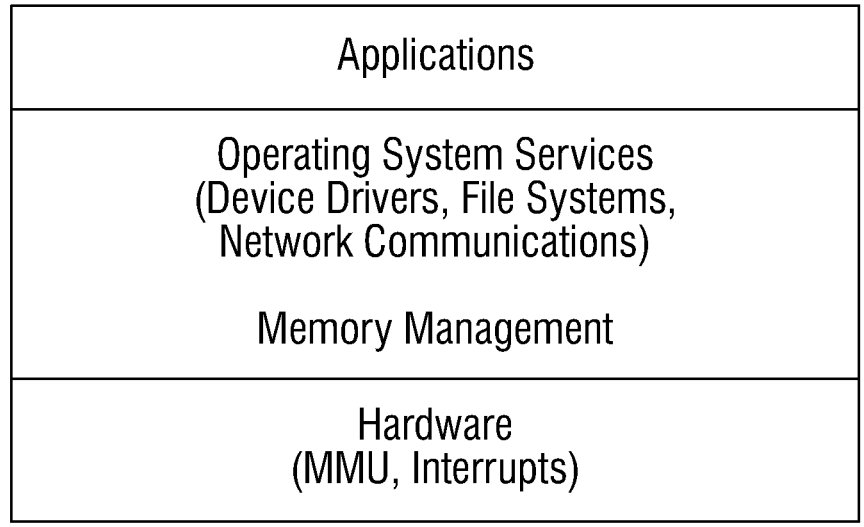
FIG. 1 is a block diagram of a system architecture including a normal operating system.
Figure 2:
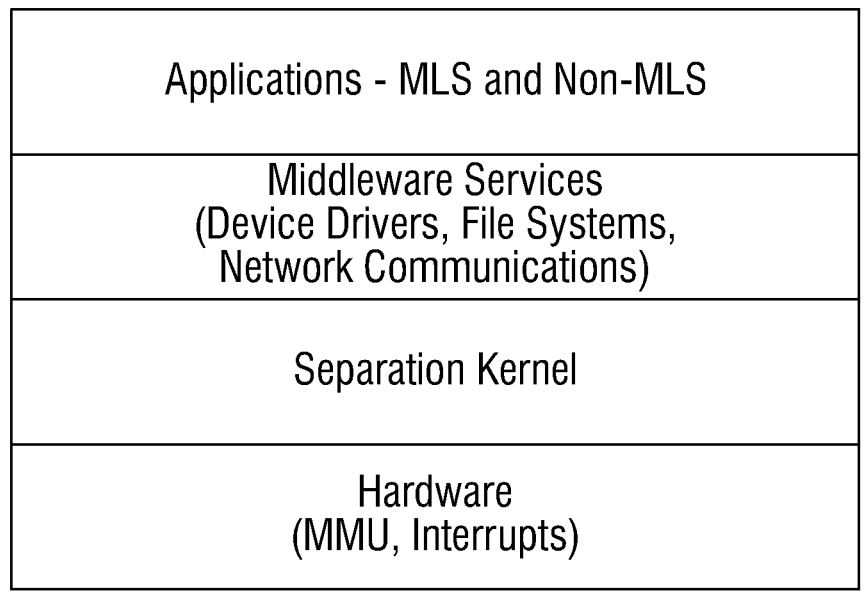
FIG. 2 is a block diagram of a system architecture including a multiple independent levels of security (MILS) separation kernel.
Figure 3:
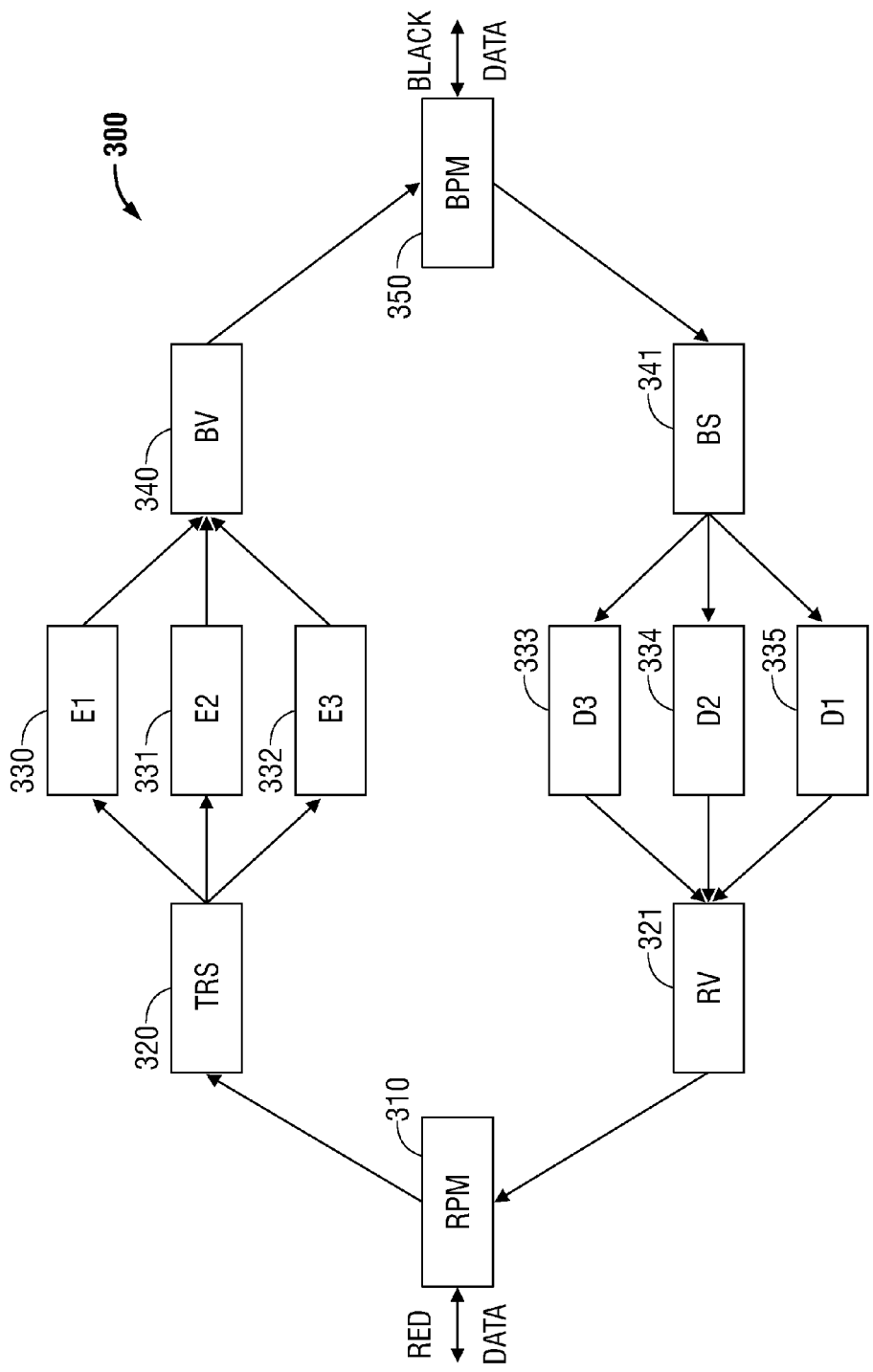
FIG. 3 is a block diagram of a separation kernel that is known in the prior art for the separation of information within a single processor.
Figure 4:
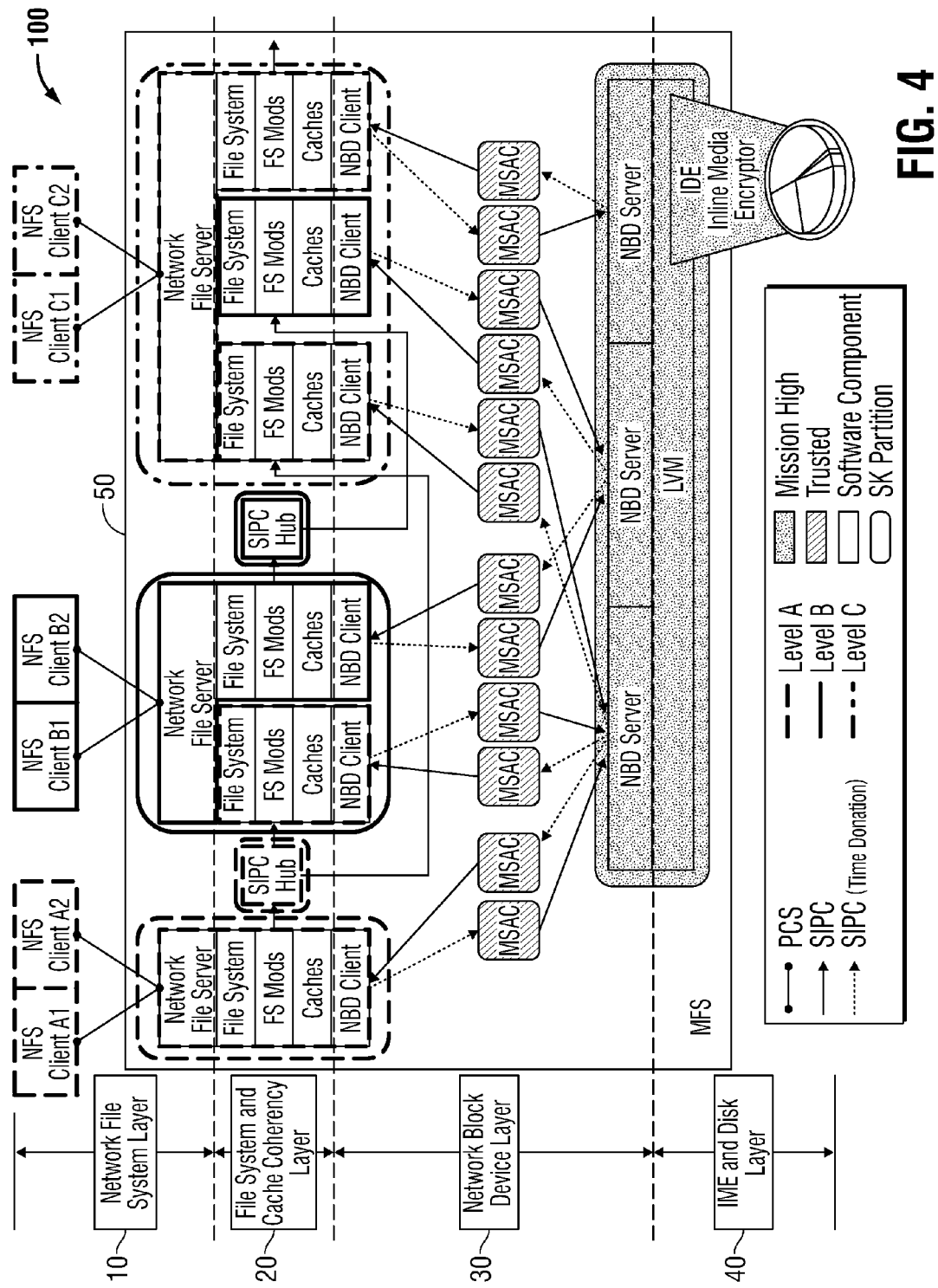
FIG. 4 is a schematic diagram of a multi-level security (MLS) system architecture in accordance with an embodiment of the present disclosure.

Hereinafter, embodiments of a multi-level security system for enabling secure file sharing across multiple security levels and method thereof are described with reference to the accompanying drawings. Like reference numerals may refer to similar or identical elements throughout the description of the figures.

This description may use the phrases "in an embodiment," "in embodiments," "in some embodiments," or "in other embodiments," which may each refer to one or more of the same or different embodiments in accordance with the present disclosure.

As it is used herein, the term "computer" generally refers to anything that transforms information in a purposeful way. In this description, the terms "software" and "code" may be applicable to software, firmware, or a combination of software and firmware. For the purposes herein, the term "data processing apparatus" is interchangeable with the term "computer."

As it is used in this description, "reference monitor" generally refers to the concept of having access decisions go through a small software, or hardware and software, monitor. To be effective in providing security, the implementation of a reference monitor is generally required to be: nonbypassable—always invoked when the system performs an operation that is covered by the system's security policy; tamper-proof—protected from modifications that could affect how it enforces security; and simple enough for analysis—small and simple enough so that independent evaluators can examine it and determine with confidence that it correctly enforces security. The software, or hardware and software, that implement a reference monitor that meets these principles is defined as a security kernel. The reference monitor concept provides a basis for identifying a small and simple subset of the system that is responsible for and able to assure the security of the total system. This subset is called the Trusted Computing Base (TCB). The TCB may include the security kernel that implements the reference monitor and manages the physical resources, as well as "trusted subjects."

One or more embodiments of the presently-disclosed multi-level security system or elements thereof can be implemented in the form of a computer product including a computer readable storage medium with computer usable program code for performing the method steps indicated. As used herein, "computer-readable medium" generally refers to any storage device used for storing data accessible by a computer. Examples of a computer-readable medium may include: a magnetic hard disk; a floppy disk; an optical disk, such as a CD-ROM and a DVD; a magnetic tape; a flash removable memory; a memory chip; and/or other types of media that may store machine-readable instructions thereon. "Non-transitory" computer-readable medium include all computer-readable medium, with the sole exception being a transitory, propagating signal.

Various embodiments of the present disclosure provide a multi-level security system enabling secure file sharing across multiple security levels and configured to provide separation of data at rest. Embodiments of the presently-disclosed multi-level security system provide a network device that allows multiple users at multiple levels at a time.

Various embodiments of the present disclosure provide a system architecture and a network software application suitable for use in embedded systems, e.g., embedded avionics systems, that provides full data separation in the Multiple Independent Levels of Security (MILS) model across multiple processors. The presently-disclosed system architecture and network software application allow clients to continue using the commercial-off-the-shelf (e.g., Microsoft Windows, Linux, and Intel) and/or government-off-the-shelf operating systems and applications to which the end user has already been trained and is accustomed to operating.

Embodiments of the presently-disclosed multi-level security system and network software application maintain high-robustness separation of multiple levels of data at rest while eliminating redundant storage hardware per enclave, allowing timely read-down, keeping data at its lowest inherent level, and/or eliminating the need for duplicate copies of data (e.g., a copy of the unclassified image database at the secret level).

Various embodiments of the presently-disclosed network software application utilize open standard interfaces, so that clients can use a standard network file system. Embodiments of the presently-disclosed disclosed system architecture and network software application have modular layers to allow design flexibility. For example, one file server can be replaced with another with minimal effort. Embodiments of the presently-disclosed network software application may be implemented using a variety of processor architectures. Various embodiments of the present disclosure implement a reference monitor that allows clients to securely "read-down" to lower security levels and write at the same security level. This ability to securely "read-down" to lower security levels eliminates "air gap" or "data diode" transfer methods between security levels and provides users with current, un-replicated information. The presently-disclosed network software application is scalable to any suitable number of enclaves.

Embodiments of the presently-disclosed network software application may be certifiable by minimizing the Trusted Computing Base (TCB) and running it as Multiple Independent Levels of Security (MILS) applications running in High Assurance Environment (HAE) partitions. The non-high assurance portions of the network software application may run in standard Linux partitions. Embodiments may enforce a modified Bell-LaPadula policy model consisting of the "simple" security property of No Read Up operations and the "strong" security property of No Write Down or Write Up operations. Various embodiments allow read-down operations to avoid data replication, reducing swap, and/or eliminating parallel data storage architectures for each domain.

Various embodiments of the presently-disclosed network software application may utilize Advanced Encryption Standard (AES) with Galois Counter Mode (GCM) for encryption and authentication of data, and/or may rely on an Inline Media Encryptor (IME) to provide Type 1 encryption of data at rest. The AES specifies a Federal Information Processing Standards (FIPS)-approved cryptographic algorithm that can be used to protect electronic data. The AES algorithm is a symmetric block cipher that can encrypt (encipher) and decrypt (decipher) information. Encryption converts data to an unintelligible form called ciphertext; decrypting the ciphertext converts the data back into its original form, called plaintext. The IME is a media encryption device that is positioned "in line" between the computer processor and the hard drive to ensure that anything stored to the hard drive gets encrypted and anything retrieved from the hard drive gets decrypted. The IME provides Type 1 encryption on a computer's integrated device electronics (IDE) hard drive. The IME encrypts all physical sectors, including the operating system (OS). With the IME physically positioned between the computer system and its hard drive, all data must pass through the IME and is stored encrypted on an IDE hard drive. Only those files "called" from the hard drive get decrypted. The hard drive always remains encrypted.

Benefits of using the presently-disclosed multi-level security system and network software application in an embedded platform include savings in weight and power required to provide persistent storage to a multi-level architecture. As part of a MLS architecture, the presently-disclosed multi-level security system and network software application also make it possible for an embedded platform to process data and to communicate at multiple security levels by keeping data at its inherent lowest security level. For example, a platform privy to top secret data may still process and output unclassified data on unclassified channels.

In FIG. 1, an embodiment of a system architecture 100 for a Multiple Levels of Security (MLS) File Store (generally referred to herein as MFS 50) is shown for use with various applications. The MFS 50 is a network software appliance enabling secure file sharing across multiple security levels, and generally includes four layers that can be individually replaced with different products. The MFS 50 provides encryption and access for blocks of a file, supporting random access, which is critical for large files, e.g., databases. The MFS 50 is accessed at a block level using NFS and separates files onto different partitions on disks. The MFS 50 includes write capability and transparently provides access to an entire disk partition. In some embodiments, the MFS 50 uses a single shared disk.

As illustrated in FIG. 1, the system architecture 100 includes a Network File System Layer 10, a File System and Cache Coherency Layer 20, a Network Block Device Layer 30, and an IME and Disk Layer 40. The Network File System Layer 10 allows multiple clients at the same security level to access a shared file system with read and write access. The network file system layer 10 is a commonly used network file system; however, it does not support the redundancy and failover that is required in an airborne mission system. Each network file system will serve (e.g., export) one virtual disk for each domain its clients may access, with all but the disk at the client's level exported as read-only. The security policy is not trusted to be enforced in this layer by the read-only export, but it has the benefit of mitigating attempts to write-down while still high in the software stack.

In an embodiment of the File System and Cache Coherency Layer 20, the partition file system runs a standard Linux ext2 file system and assumes that it has sole access to a "local" disk. The file system at the level of the data may write to it. Other file systems may be configured to read from it according to the security policy. Linux has caching built-in to the file system to improve performance, but extra measures must be taken to maintain coherency between multiple clients with parallel access. In some embodiments, the write-enabled file system at the level of the data sends a one-way message (e.g., forwarded to all read-only file systems by a hub) whenever it updates a file. This message tells the read-only file systems that their cache is outdated and cannot be used instead of a read from the disk. This File System and Cache Coherency Layer 20 converts file-context operations into block reads and writes.

In the Network Block Device Layer 30, the network block device transports the block-level operations to a remote disk, which may be located in a different MILS partition on the same hardware. The requests between the Network Block Device (NBD) client and NBD server are audited for the security policy, and data is cryptographically separated by domain. The MLS Separation and Access Control (MSAC) component acts as a "bump in the wire" which enforces the read-only access of the higher level partitions, encrypts/signs written data originating from an authorized source, and verifies/decrypts read data blocks to ensure only authenticated data at the correct level is being read back. Every disk block is encrypted using a unique key for each security domain. This process creates authentication tags and initialization vectors required to decrypt and verify disk blocks. In accordance with the present disclosure, this combination of encryption and authentication is used as the separation mechanism. The tags and initialization vectors are sent along with the encrypted disk blocks and are written to a separate area on the disk controlled by the NBD server. The NBD server runs in an untrusted Linux Guest OS and sends read and write commands to the physical hard disk.

In an embodiment of the IME and Disk Layer 40, the physical disk is attached to the MFS 50, and the I/O Linux partition is granted exclusive access to it through the separation kernel configuration. In some embodiments, the IME is external to the MFS 50 between the processing board and the disk. The entire disk contents are protected with Type 1 encryption provided by the IME. The existence of the IME is transparent to the separation operations of the MFS 50. The IME is used to provide protection of data at rest.

When using multiple single-level file systems, wherein one writes and possibly many others read, there is a need to maintain cache coherency across the file systems. Normally, a Linux file system assumes it has complete control of the disk, so it is not built for this purpose. As shown in FIG. 1, the File System and Cache Coherency Layer 20 includes "FS Mods." In an embodiment of the MFS 50 wherein Linux is used, FS Mods includes modification of the Linux kernel so that when a file is written, it sends a message using the separation kernel's unidirectional Secure Inter-Process Communication (SIPC) feature to inform all of the higher level read-only file systems to invalid the cache for that file.

MLS File Store (MFS) Driving Requirements

Embodiments of the MFS 50 may implement one or more driving requirements. Examples of MFS 50 driving requirements include: providing standard Linux Virtual File System (VFS) interfaces; maintaining separation of different classification level data (e.g., from Unclassified to Top Secret/SAR); supporting a plurality of different security levels or partitions; and enforcing a modified Bell-LaPadula policy model consisting of the "simple" security property of No Read Up operations and the "strong" security property of No Write Down or Write Up operations, and a subject can read an object if the security level of the subject dominates the security level of the object (i.e., a subject can Read Down). In some embodiments, the MFS 50 may support at least 5 different security levels or partitions.

In some embodiments, the MFS 50 may be required to manage data at the block level. In some embodiments, the entire file does not need to be read prior to verification. The MFS 50 may be required to be evaluateable at EAL6 or equivalent. The MFS 50 may be required to transfer data at a sustained rate of 328 Mbits per second. The MFS 50 may be required to autonomously failover with no loss of data within a predetermined period of time. The MFS 50 may be required to create audit logs of security relevant events including: disk full; disk hardware error messages; attempts to access invalid blocks; attempts to write-down; and verification failure. The MFS 50 and its clients may be required to synchronize caches for all nodes mounting the same file system.

Network File Server Driving Requirements

The network file system may be required to support autonomous failover with no loss of data within a predetermined period of time. The network file system clients may be required to support the Linux virtual file system interfaces so that software does not have to be modified or re-compiled to work with the client. The network file system clients may be required to maintain coherency with each other and the physical disk within a predetermined period of time. The network file system may be required to have no single point of failure.

I-Node and Buffer Cache Coherency Driving Requirements

The module may be required to synchronize buffer and i-node caches for all nodes mounting the same file system. Module in the writer notifies the SIPC forwarding hub when a file is written. Module in the read-only file system nodes invalidates the i-node and buffer cache of the specified file when it receives notification from the SIPC hub.

Secure Inter-Process Communication (SIPC) Forwarding Hub Driving Requirements

The hub may be required to receive data on one SIPC port and send to multiple SPIC ports as configured in the separation kernel.

Network Block Device (NBD) Driving Requirements

The NBD client may be required to provide a mountable device to the Linux VFS. The NBD client may be required to send all block accesses to the NBD server for processing. The NBD client and server may be required to use an open common standard interface for their messages. The NBD server may be required to support concurrent access from one read/write client and multiple read-only NBD clients to the same data store. The NBD may be required to support a sustained data transfer rate of 800 Mbits per second.

MSAC Driving Requirements

The MSAC may be required to encrypt data written with separate keys for each level, and/or may be required to use FIPS-approved algorithms. In some embodiments, the system may be certified using FIPS140-2 at Level 4. The MSAC may be required to authenticate each written block. Authentication data may be stored in a separate partition on the disk. The MSAC may be required to be developed to run in a high-assurance partition. The MSAC may be required to verify that a block of data read from the disk is the same data written to that block. The MSAC may be required to support at least 5 different security levels or partitions. The MSAC may be required to support a sustained data transfer rate of 800 Mbits per second. The MSAC may be required to prevent read-only clients from writing data. Audit log entries may be sent via SIPC to a partition that can then write to a partition on the disk. Auditable events may include: disk full; prevent resource utilization covert channel by high side application if single-partition; prevent resource utilization covert channel by low-level disk driver and/or hardware if multiple partitions; other error messages from the disk hardware/driver; attempts to read-up (or block out of range) or write-down; verification failure (bad signature); incorrect block read.

Disk Driver Driving Requirements

In some embodiments, the disk driver runs in a Wind River Guest OS partition running on the Wind River SK. The Guest OS partition may be untrusted. The disk driver may be required to support a sustained data transfer rate of 800

Mbits per second. In some embodiments, the disk driver may interface with the disk attached to the IME.

Because read-only access to read-down file systems is integral to the MFS 50 design and function, not all distributed file systems will meet the functional requirements for the file system component of the MFS 50.

File System

The file system manages files on the disk and writes them to blocks, and may be based on an open common standard. The file system may support one or more MFS 50 requirements: rapid coherency in creating, appending to, and modifying files. The file system may be configured to issue write commands without delay otherwise other file systems will be unaware of any changes.

The file system may be required to satisfy additional criteria, e.g., stability and read-only access. The file system logical layer may be configured to mitigate data corruption in the event of a hard reset, connection loss, or other interruption of services. The file system may be configured to support mounting as read-only without modifying the disk contents.

Network Block Device (NBD) Server

Various COTS network block devices may be suitable for use in the MFS 50. For the purposes of this description, the generalized network block device will be referred to as NBD, while the implementation called Network Block Device will be referred to as NBD-1.

A network block device (NBD) exports a hardware device across a network connection. A remote system accessing the device through NBD can utilize it as if the device were connected locally. NBD devices operate on fixed-size blocks of data as opposed to files. In a prototype of the MFS 50, the NBD is the data protocol between the network file server and the disk controller. The NBD client runs within the network file server partition and exposes a block device to the kernel, forwarding block I/O requests to the MSAC via SIPC. The MSAC partition performs security operations on the data before forwarding the requests to the NBD server, which then carries out operations on the actual block device representing the disk.

The NBD may be required to support one or more MFS 50 requirements. Examples of MFS 50 NBD requirements include: the NBD client providing a mountable device to the Linux VFS; the NBD client sending all block accesses to the NBD server for processing; the NBD client and server using an open common standard interface for their messages; the NBD server supporting concurrent access from one read/write client and multiple read-only NBD clients to the same data store; NBD supporting a sustained data transfer rate of 800 Mbits per second; rapid coherency in creating, appending to, and modifying files. Data flow between levels passes through the NBD. If the NBD delays writes or attempts to cache data it would hurt inter-level performance and data consistency.

The NBD may also be required to support other criteria, e.g., simplicity of protocol. A simpler NBD protocol will allow for a simpler MSAC, reducing the amount of code that needs to be run in the trusted partition. Using the UDP network protocol may improve performance and simplify the system because of the lack of handshaking required.

An implementation of an NBD (referred to herein as NBD-1) is included in most major Linux distributions. NBD-1 is included as a loadable module in Wind River Linux 3.0. Examples of NBD-1 that may be suitable for use with the MFS 50 include xNBD, ATA over Ethernet, ENBD, and GNBD.

Scheduling

This section addresses how the MFS 50 partitions may be scheduled. Simple, fixed schedule—each partition gets a time slice in a cycle. Exception: the MSAC goes twice, before and after the I/O partition. Alternating, fixed schedule—same as the fixed schedule, except that the MSAC & I/O partitions follow each file system server (FSS) partition. Time-donating—the MSAC is a service partition, invoked by the FSS and I/O partitions as needed using donated time.

The fixed, simple schedule is the simplest to configure. However, fixed, simple schedule has the longest possible latency between a write operation performed by the file system and a commit to the physical media. Furthermore, a fixed schedule would likely result in inefficient use of processing resources as partitions with no data to act on idle the CPU during their fixed windows. The next option is to use a fixed, alternating schedule. This schedule contains repeated invocations of the MSAC or separate MSAC partitions after each FSS partition. This allows use of the SK schedule to perform round robin servicing of the FSS requests. However, any fixed-scheduling approach is likely to result in idle invocations of the MSAC.

In the time-donating schedule, the MSAC is not directly scheduled by the SK. Instead, the MSAC operates as a service partition that can be invoked by other partitions. It requires the other components to use time-donating SIPC messages, which donate that partition's time to the MSAC service. Until the MSAC finishes processing the request, the MSAC will be scheduled whenever the application's partition would normally be scheduled. The result is that there are smaller SIPC buffers because requests are addressed immediately. The MSAC is only invoked when needed, resulting in less dedicated (and potentially unused) time slices. The network-connected file system server partitions and I/O partition are still scheduled in a fixed schedule. This approach has the lowest latency. We have specified the time-donating schedule for two reasons. First, it has a more efficient use of RAM because SIPC do not need as much buffering—data is forwarded and processed immediately on time-donation-enabled channels. Second, there is no need to determine a static MSAC schedule based on an estimation of how much time the MSAC should take per partition. This results in more efficient use of CPU time as the MSAC will never be scheduled and running idle.

System Initialization

True system initialization is beyond the scope of this description. The following description ignores that standard secure initialization steps such as hardware checkout and source code authentication, and instead focuses on the elements that are unique to the MFS 50. The primary functions that the MFS 50 needs for initialization are to manage and distribute keys to each of the MSAC partitions, configure read/write access permissions in the MSAC partitions, and configure the hub partitions. One way to implement the initial startup software is to have a dedicated HAE startup partition. This partition is initially scheduled as the only partition running Once it has finished its configuration, it can change the schedule to normal steady state operation, removing itself from the schedule.

MFS Initialization

Standard secure initialization steps such as hardware checkout and source code authentication are outside the scope of this demonstration. Instead, our implementation focuses on the elements that are unique to the MFS 50. The primary functions that the MFS 50 needs for initialization are to manage and distribute keys to each of the MSAC partitions and initialize the hub partitions. To accomplish this, a small HAE partition may be used as the only partition in the initial schedule. It uses dedicated SIPC queues to send keys to the MSACs and configuration information to the hubs and audit partition. Once all of the runtime configuration data is waiting in SIPC queues, the initialization partition changes the schedule to normal running mode, where the file system and I/O partitions share the processor time. The initialization partition is permitted by XML configuration to use the schedule changing routines in the MILS API.

Audit

The system needs to collect audit logs from the MILS Kernel, the MSAC and other high-assurance components. Although full implementation of the audit subsystem is beyond the scope of this demonstration, the demonstration MFS 50 can collect and display auditable events. Auditable events are reported externally by the MFS 50 to a serial port for analysis or collection by the audit subsystem device. Creating such an audit subsystems is beyond the scope of this effort and as such the serial output is displayed on a console.

A prototype implementation of the MFS 50 that implemented an open, modular, high assurance design that enforced the core security features was started on the Power PC (PPC) and ported to the x86. As it is used herein, the term "x86" generally refers to the Intel x86 CPU architecture. Use of the Wind River® Multiple Independent Levels of Security (MILS) platform on both PCC and x86 architectures allowed the system developers to be hardware agnostic when developing software.

The MFS 50 prototype was designed to be compatible with high-assurance design concepts so that it could be built in the future to meet EAL 6 certification requirements. Security tests to assess performance of the prototype implementation of the MFS 50 and/or to determine potential performance enhancements included an embedded fusion application using the MFS 50 to store track data generated from multiple single-level sensors. Multiple single-level Google Earth applications were used to display the track data that they were allowed to see.

The security tests of the prototype implementation of the MFS 50 demonstrated read-down capability, read-up failure, write-down failure, errors in data integrity, the inability to use disk message fields as a potential covert channel, and various MFS 50 failure modes. The security tests successfully demonstrated the ability to view different track data at two different levels. The prototype implementation of the MFS 50 was limited to two levels because the x86 processors only have three network interfaces, one of which is used to access the disk. The prototype implementation of the MFS 50 was configured to allow partitions to read data at lower levels while preventing partitions from writing data to those lower levels.

The prototype implementation of the MFS 50 used the Linux ext2 file system and serialized all disk block access. It is contemplated that grouping the blocks and sending them as chunks will significantly improve performance. The ext2fs file system of the prototype implementation of the MFS 50 appeared to significantly limit throughput within the MFS 50 by generating a large number of block-level writes when the sync mount option was used. Replacement of the Linux ext2 file system of the prototype implementation of the MFS 50 with the ext3 file system may result in a significant improvement, e.g., 20 times improvement. The prototype implementation of the MFS 50 used the Network Block Device (NBD) protocol to communicate from the file server to the disk. Replacement of the NBD with ATA over Ethernet (AoE) would result in a performance increase. The prototype implementation of the MFS 50 used software encryption. Switching to hardware encryption would also improve performance. Improvements to the Wind River MILS x86 EAR to allow larger SIPC ports would also increase performance.

Porting the MFS 50 to run on the PowerPC MILS, which has better network performance and larger SIPC ports, may also lead to some performance increases. When building for the x86 MILS EAR, Linux guest OS partitions are not stable with time slices shorter than 20 ms. This necessarily limits the partition switch rate and increases latency for each NBD operation within the MFS 50. As a result, throughput is reduced. The PowerPC MILS release is able to run with much shorter time slices. It is contemplated that this would result in much faster processing within the MFS 50 and an overall improvement in MFS 50 performance.

The MFS 50 has the ability to view different track data at a plurality of different levels. In some embodiments, the use of PCS allows the MFS 50 to communicate at three levels.

Taking a modular, layered approach to the MFS 50 design provides flexibility into the prototyping effort. Utilizing open, commonly implemented standards and commercial off-the-shelf (COTS) components allows the MFS 50 to leverage the open design for agile responses to challenges with minimal integration pain and no modification of custom software or changes to the certification-relevant parts of the system. In some embodiments, the interface to the network file system layer is the standard Linux file system interface. Because the interface between layers is an open, commonly implemented standard it was possible to replace a layer with an alternate COTS component without writing any custom code.

In some embodiments, the IME and Disk layer 40 is a standard Linux device file, which allows the use an unmodified COTS product and allows changes to be made to an untrusted part of the MFS 50 design with no effect on other layers.

Using block-level separation allows the use a simple MSAC. There was no need to read an entire file to decrypt it, no special handling of directory entries, etc. Meeting the basic IA requirements (no read-up, no write-down, no write-up, and allow read-down) can be accomplished with a straightforward, small codebase. Making a useful read-down at the file level, however, may take more time and effort than any other part of the MFS 50.

Figure 5:
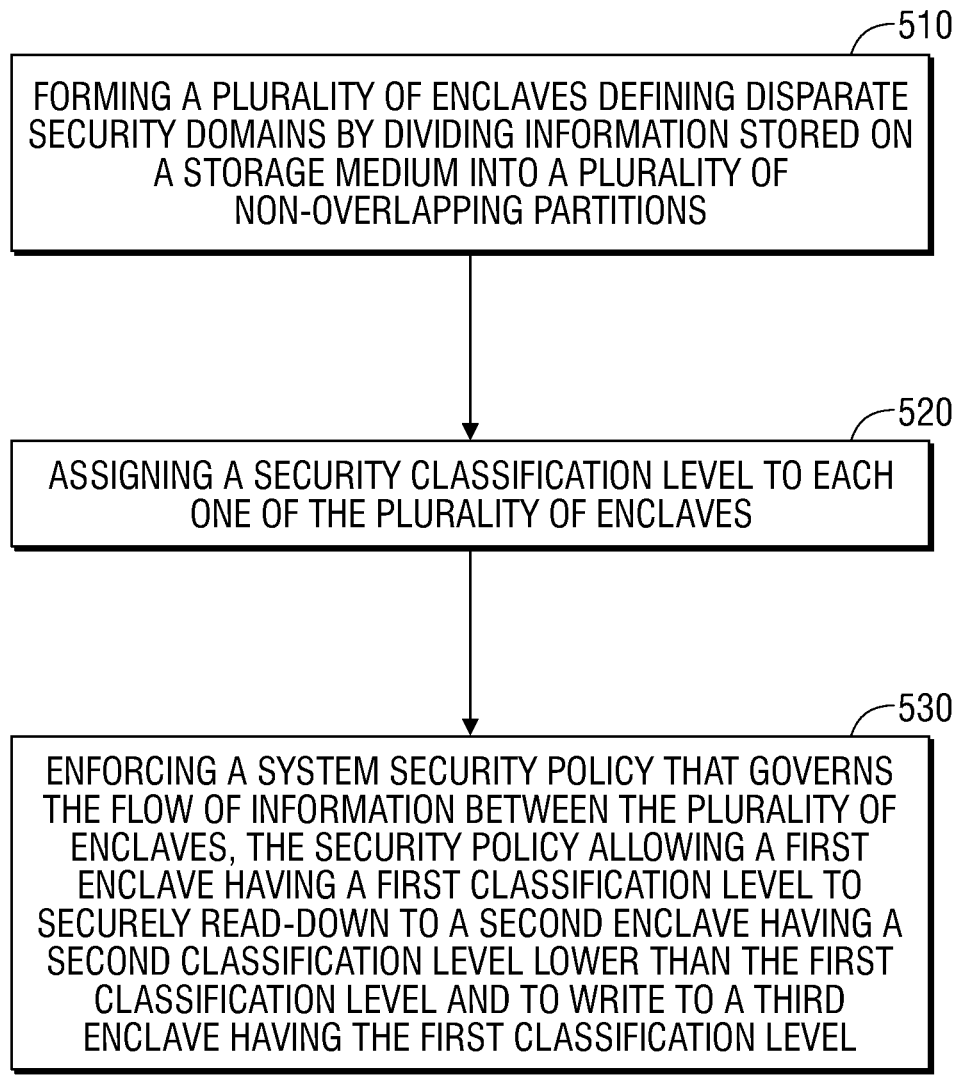
FIG. 5 is a flowchart illustrating a method of secure file sharing across multiple security levels in accordance with an embodiment of the present disclosure.

FIG. 5 is a flowchart illustrating a method of secure file sharing across multiple security levels in accordance with an embodiment of the present disclosure. In block 510, a plurality of enclaves defining disparate security domains is formed by dividing information stored on a storage medium into a plurality of non-overlapping partitions.

In block 520, a security classification level is assigned to each one of the plurality of enclaves.

In block 530, a system security policy that governs the flow of information between the plurality of enclaves is enforced. The security policy allows a first enclave having a first classification level to securely read-down to a second enclave having a second classification level lower than the first classification level and to write to a third enclave having the first classification level.

Although embodiments have been described in detail with reference to the accompanying drawings for the purpose of illustration and description, it is to be understood that the disclosed processes and systems are not to be construed as limited thereby. It will be apparent to those of ordinary skill in the art that various modifications to the foregoing embodiments may be made without departing from the scope of the disclosure.

What is claimed is:

1. A multi-level security system, the system comprising: a storage medium, the storage medium partitionable into a plurality of partitions; a file system coupleable to the plurality of partitions;
   a plurality of enclaves each assigned a security classification level, wherein each one of the plurality of enclaves resides in a different storage partition of the storage medium;
   wherein data stored on the storage medium is cryptographically separated at rest on a per-enclave basis, and wherein cryptographic separation occurs at the disk block level thereby allowing individual blocks to be read and decrypted; wherein every disk block is encrypted using a unique key for each security classification level; and
   a reference monitor that enforces a system security policy that governs access to information between the plurality of enclaves, wherein the reference monitor allows an enclave of the plurality of enclaves having a first classification level to securely read-down to another enclave of the plurality of enclaves having a second classification level lower than the first classification level and to write to another enclave of the plurality of enclaves having the first classification level.

2. A non-transitory computer-readable medium embodying program instructions for execution by a data processing apparatus, the program instructions adapting the data processing apparatus for transmitting information classified at different security classification levels while maintaining data separation of the information, the program instructions comprising:
   forming a plurality of enclaves defining disparate security domains by dividing information stored on a storage medium into a plurality of non-overlapping partitions;
   assigning a security classification level to each one of the plurality of enclaves;
   encrypting each of the plurality of non-overlapping partitions using a unique key for each security classification level; and
   enforcing a system security policy that governs the flow of information between the plurality of enclaves, the security policy allowing a first enclave having a first classification level to securely read-down to a second enclave having a second classification level lower than the first classification level and to write to a third enclave having the first classification level.

3. The multi-level security system of claim 1, wherein the storage medium is a single physical disk.

4. The non-transitory computer-readable medium of claim 2, wherein the step of enforcing a system security policy that governs the flow of information between the plurality of enclaves includes prohibiting write-down and write-up operations.

5. The non-transitory computer-readable medium of claim 2, wherein the step of enforcing a system security policy that governs the flow of information between the plurality of enclaves includes prohibiting read-only clients from writing data.

6. The non-transitory computer-readable medium of claim 2, wherein the step of forming a plurality of enclaves defining disparate security domains by dividing information stored on a storage medium into a plurality of non-overlapping partitions includes dividing information stored on a storage medium into a plurality of non-overlapping partitions on a single physical disk.

* * * * *